US012707477B2

(12) United States Patent
Ganesan et al.

(10) Patent No.: US 12,707,477 B2
(45) Date of Patent: Aug. 11, 2026

(54) REQUESTING A SIDELINK POSITIONING REFERENCE SIGNAL RESOURCE

(71) Applicant: Lenovo (Singapore) Pte. Ltd., New Tech Park (SG)

(72) Inventors: Karthikeyan Ganesan, Kronberg im Taunus (DE); Robin Thomas, Bad Nauheim (DE); Ankit Bhamri, Rödermark (DE); Ali Ramadan Ali, Kraiburg am Inn (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 308 days.

(21) Appl. No.: 18/000,261

(22) PCT Filed: May 28, 2021

(86) PCT No.: PCT/IB2021/054723

§ 371 (c)(1),
(2) Date: Nov. 29, 2022

(87) PCT Pub. No.: WO2021/240479

PCT Pub. Date: Dec. 2, 2021

(65) Prior Publication Data

US 2023/0224121 A1 Jul. 13, 2023

Related U.S. Application Data

(60) Provisional application No. 63/032,286, filed on May 29, 2020, provisional application No. 63/032,225, filed on May 29, 2020.

(51) Int. Cl.

*H04W 72/25* (2023.01)
*H04L 5/00* (2006.01)

(Continued)

(52) U.S. Cl.

CPC ........... *H04W 72/25* (2023.01); *H04L 5/0048* (2013.01); *H04L 5/0051* (2013.01); *H04W 64/00* (2013.01); *H04W 92/18* (2013.01)

(58) Field of Classification Search

CPC ..... H04W 72/25; H04W 64/00; H04W 92/18; H04W 76/14; H04W 72/0453;

(Continued)

(56) References Cited

U.S. PATENT DOCUMENTS

2019/0230618 A1* 7/2019 Saur .................... H04W 56/001
2019/0380056 A1* 12/2019 Lee ....................... G01S 5/0036

(Continued)

FOREIGN PATENT DOCUMENTS

EP 3796587 B1 10/2023
KR 20170036736 A 4/2017

(Continued)

OTHER PUBLICATIONS

PCT/IB2021/054723, "Notification of Transmittal of the International Search Report and the Written Opinion of the International Searching Authority, or the Declaration", International Searching Authority, Sep. 27, 2021, pp. 1-14.

(Continued)

*Primary Examiner* — Kabir A Timory
(74) *Attorney, Agent, or Firm* — Kunzler Needham Hilton

(57) ABSTRACT

Apparatuses, methods, and systems are disclosed for requesting a sidelink positioning reference signal resource. One method includes transmitting a request for at least one resource for a sidelink positioning reference signal. The method includes receiving a response to the request for the at least one resource for the sidelink positioning reference signal. The method includes transmitting a sidelink posi- (Continued)

tioning reference signal in the at least one resource. The method includes transmitting a report containing estimated positioning information.

18 Claims, 6 Drawing Sheets

(51) Int. Cl.
*H04W 64/00* (2009.01)
*H04W 92/18* (2009.01)

(58) Field of Classification Search
CPC ... H04L 5/0048; H04L 5/0051; H04L 5/0053; H04L 1/08
See application file for complete search history.

(56) References Cited

U.S. PATENT DOCUMENTS

| | | | | |
|---|---|---|---|---|
| 2020/0028648 | A1* | 1/2020 | Akkarakaran | H04W 76/27 |
| 2020/0037343 | A1 | 1/2020 | He et al. | |
| 2020/0154240 | A1 | 5/2020 | Edge et al. | |
| 2021/0410084 | A1 | 12/2021 | Li et al. | |
| 2022/0183002 | A1 | 6/2022 | Yeo et al. | |
| 2022/0210801 | A1 | 6/2022 | Xu et al. | |
| 2022/0317229 | A1* | 10/2022 | Baek | H04W 64/00 |
| 2023/0146161 | A1 | 5/2023 | Sun et al. | |
| 2023/0198708 | A1* | 6/2023 | Hong | H04L 5/0094 370/329 |
| 2023/0209494 | A1 | 6/2023 | Dai et al. | |
| 2023/0221397 | A1* | 7/2023 | Baek | H04L 5/005 455/456.1 |

FOREIGN PATENT DOCUMENTS

| | | | |
|---|---|---|---|
| KR | 20200050901 | A | 5/2020 |
| WO | 2016048510 | A1 | 3/2016 |
| WO | 2020033088 | A1 | 2/2020 |
| WO | 2020091545 | A1 | 7/2020 |

OTHER PUBLICATIONS

PCT/IB2021/054722, "Notification of Transmittal of the International Search Report and the Written Opinion of the International Searching Authority, or the Declaration", International Searching Authority, Oct. 8, 2021, pp. 1-13.

Huawei et al., "Discussion of sidelink positioning", 3GPP TSG RAN WG1 #101-e R1-2004609, May 25-Jun. 5, 2020, pp. 1-5.

3GPP, "3rd Generation Partnership Project; Technical Specification Group Services and System Aspects; Service requirements for the 5G system; Stage 1 (Release 17)", 3GPP TS 22.261 V17.2.0, Mar. 2020, pp. 1-83.

3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; Physical layer measurements (Release 16)", 3GPP TS 38.215 V16.1.0, Mar. 2020, pp. 1-22.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

U.S. Appl. No. 18/000,213 "Office Action Summary", US Patent and Trademark Office, Mar. 6, 2025, pp. 1-19.

U.S. Appl. No. 18/000,213 "Office Action Summary", US Patent and Trademark Office, Sep. 10, 2025, pp. 1-26.

Vodafone, "Summary of email discussion on NR V2X study item", 3GPP TSG RAN #79 RP-180426, Mar. 19-22, 2018, pp. 1-27.

* cited by examiner

SL UE B 402

SL UE A 404 gNB 406

Location Server LMF 408

412

414

416

418

426

428

420

430

432

422

434

436

438

424

440

442

REQUESTING A SIDELINK POSITIONING REFERENCE SIGNAL RESOURCE

CROSS-REFERENCE TO RELATED APPLICATIONS

This application claims priority to U.S. Patent Application Ser. No. 63/032,286 entitled "APPARATUSES, METHODS, AND SYSTEMS FOR SL PRS ALLOCATION PROCEDURE" and filed on May 29, 2020 for Karthikeyan Ganesan, and U.S. Patent Application Ser. No. 63/032,225 entitled "APPARATUSES, METHODS, AND SYSTEMS FOR SL PRS RESOURCE POOL CONFIGURATION" and filed on May 29, 2020 for Karthikeyan Ganesan, all of which are incorporated herein by reference in their entirety.

FIELD

The subject matter disclosed herein relates generally to wireless communications and more particularly relates to requesting a sidelink positioning reference signal resource.

BACKGROUND

In certain wireless communications networks, a sidelink positioning reference signal may be transmitted. The sidelink positioning reference signal may be used for estimating positioning information.

BRIEF SUMMARY

Methods for requesting a sidelink positioning reference signal resource are disclosed. Apparatuses and systems also perform the functions of the methods. One embodiment of a method includes transmitting a request for at least one resource for a sidelink positioning reference signal. In some embodiments, the method includes receiving a response to the request for the at least one resource for the sidelink positioning reference signal. In certain embodiments, the method includes transmitting a sidelink positioning reference signal in the at least one resource. In various embodiments, the method includes transmitting a report containing estimated positioning information.

One apparatus for requesting a sidelink positioning reference signal resource includes a transmitter that transmits a request for at least one resource for a sidelink positioning reference signal. In various embodiments, the apparatus includes a receiver that receives a response to the request for the at least one resource for the sidelink positioning reference signal. The transmitter transmits a sidelink positioning reference signal in the at least one resource, and transmits a report containing estimated positioning information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
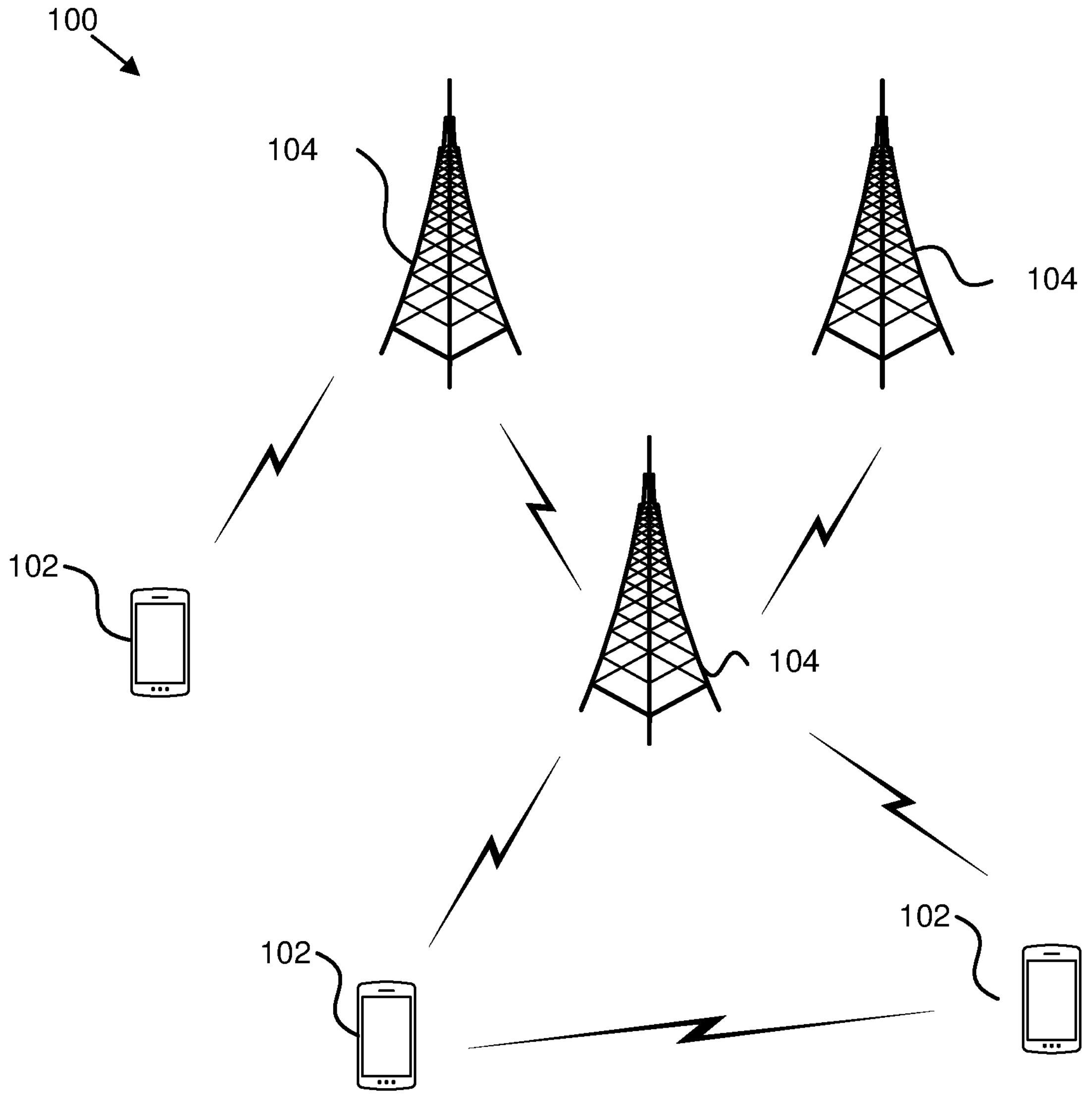
FIG. 1 is a schematic block diagram illustrating one embodiment of a wireless communication system for requesting a sidelink positioning reference signal resource.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for requesting a sidelink positioning reference signal resource. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit a request for at least one resource for a sidelink positioning reference signal. In some embodiments, the remote unit 102 may receive a response to the request for the at least one resource for the sidelink positioning reference signal. In certain embodiments, the remote unit 102 may transmit a sidelink positioning reference signal in the at least one resource. In various embodiments, the remote unit 102 may transmit a report containing estimated positioning information. Accordingly, the remote unit 102 may be used for requesting a sidelink positioning reference signal resource.

Figure 2:
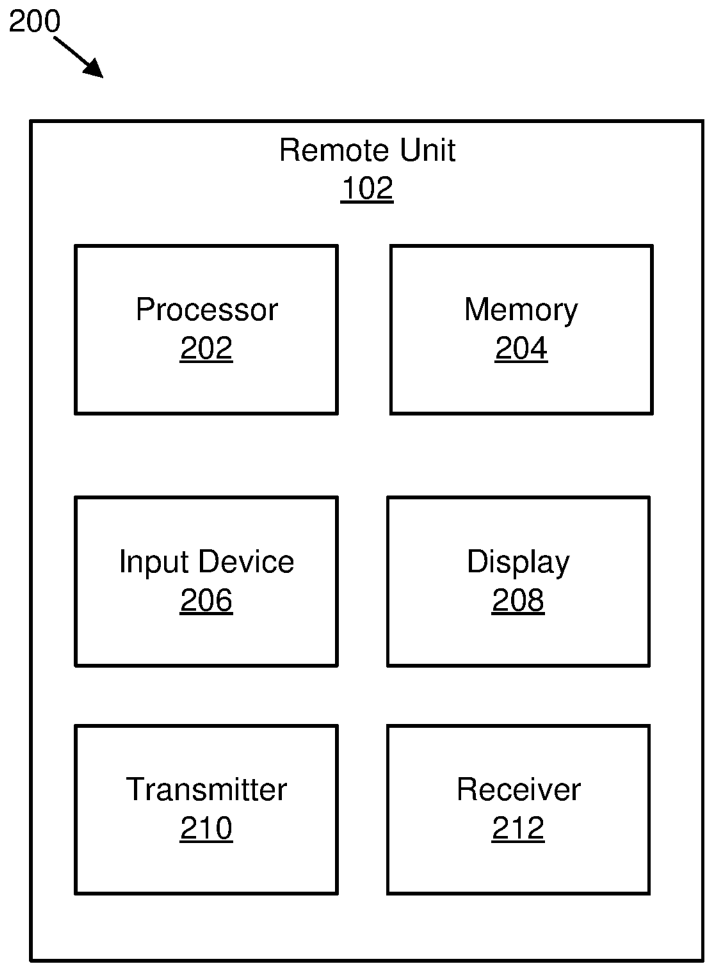
FIG. 2 is a schematic block diagram illustrating one embodiment of an apparatus that may be used for requesting a sidelink positioning reference signal resource.

FIG. 2 depicts one embodiment of an apparatus 200 that may be used for requesting a sidelink positioning reference signal resource. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits a request for at least one resource for a sidelink positioning reference signal. In various embodiments, the receiver 212 receives a response to the request for the at least one resource for the sidelink positioning reference signal. The transmitter 210 transmits a sidelink positioning reference signal in the at least one resource, and transmits a report containing estimated positioning information.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
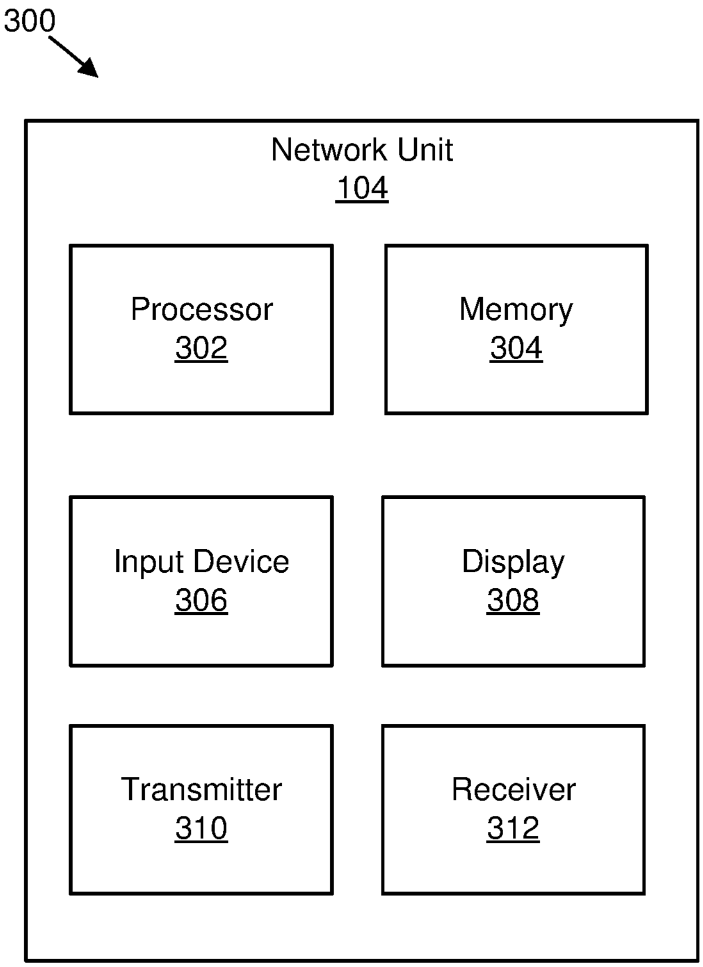
FIG. 3 is a schematic block diagram illustrating one embodiment of an apparatus that may be used for indicating a sidelink positioning reference signal resource.

FIG. 3 depicts one embodiment of an apparatus 300 that may be used for indicating a sidelink positioning reference signal resource. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, a sidelink positioning method may be used to help with precise positioning measurement for an indoor factory environment and/or for vehicle positioning. In various embodiments, accuracy and the latency requirements may vary between an indoor factory environment and vehicle to everything ("V2X") communications. In certain embodiments, sidelink adds another dimension by calculating relative positioning between objects and/or vehicles. In such embodiments, a number of anchor nodes transmitting reference signals on sidelink ("SL") for positioning (e.g., SL positioning reference signals ("PRS")) may play an important role for high accuracy positioning. In some embodiments, there may be a method of configuring a resource pool structure for reference signals for SL positioning, a method for resource allocation and transmitting reference signals with mode 1, and/or interworking between UE to network interface ("Uu") and SL positioning to achieve high accuracy positioning.

In certain embodiments, sidelink resource pools may be used for transmitting only SL data, and mode 2 resource allocation (e.g., UE autonomous resource allocation) and mode 1 resource allocation (e.g., gNB resource allocation) may be used for SL data transmission. In some embodiments, system configuration of resource pools and/or resource allocation methods may be used for the transmission of reference signals on SL for positioning.

As used herein, the terms eNB and/or gNB may be used for a base station but may be replaceable by any other radio access node (e.g., base station ("BS"), eNB, gNB, AP, NR, and so forth). Moreover, embodiments described herein may be described in the context of 5G NR; however, they may be applicable to other mobile communication systems supporting serving cells and/or carriers configured for sidelink communication over a UE to UE interface (e.g., PC5 interface).

It should be noted that, while SL PRS may be used in some embodiments, SL positioning may be estimated with any SL reference signal ("RS"). In various embodiments, in a type of SL RS to be used for a positioning estimate may be provided to a user equipment ("UE").

In certain embodiments, there may be an anchor UE (e.g., a UE whose own position is known accurately). In some embodiments, there may be non-Anchor UEs (e.g., UEs with unknown position and/or location information).

In various embodiments, model information in signaling may means SL PRS transmission from one-to-one (e.g., TX UE to RX UE), one-to-many (e.g., TX UE to multiple RX UEs), many-to-one (e.g., RX UEs to a TX UE), and/or bidirectional SL PRS transmission. In certain embodiments, LPP signaling and/or gNB downlink signaling may indicate a model to be used for SL positioning and/or a SL positioning technique.

In various embodiments, a resource pool bandwidth for SL PRS transmission or SL PRS bandwidth may be configured across SL bandwidth parts ("BWPs") and/or SL carriers for wideband SL PRS transmission. In certain embodiments, resource pool and/or SL PRS bandwidth for each carrier may be provided and multiple sidelink carriers may be configured per UE for SL PRS transmissions. In some embodiments, a number of symbols used in a slot for SL PRS transmission may be configured. In such embodiments, the following may also be configured: a SL PRS frequency offset with respect to each member in a group, a SL PRS comb pattern, a SL PRS periodicity, a repetition pattern, a repetition factor, SL PRS transmit power related parameters, and/or a muting pattern.

In various embodiments, SL assistance data may include a mapping of positioning accuracy and latency to priority and remaining packet delay budget ("PDB"), SL PRS transmission occasions per resource pool, a number of subchannels of SL PRS transmission per resource pool, a SL positioning technique (e.g., time difference of arrival ("TDOA"), angle of departure ("AoD"), and so forth), a SL positioning type (e.g., model A, model B, or model C), a report configuration, source-destination ID information for SL PRS transmission, a source-destination group ID, a minimum communication range ("MCR"), an anchor UE's positioning information (e.g., depends on network or UE based positioning or relative positioning) and so forth. In certain embodiments, PC5 RRC signaling may carry information about a SL PRS resource configuration for unicast transmission. In some embodiments, a destination identifier ("ID") may mean a UE ID.

In a first embodiment, on-demand SL positioning and/or on-demand SL PRS transmission may be used. In such an embodiment, an on-demand SL PRS transmission may be configured by a gNB and/or location management function ("LMF") or may be requested by a TX UE to dynamically allocate SL PRS resources or update a PRS resource configuration with respect to a positioning method and dynamically update a SL transmission configuration information ("TCI") and/or quasi-co-location ("QCL") assumption for SL PRS. Moreover, in such an embodiment, the LMF provides an initial QCL and/or TCI for the SL PRS transmission. In one embodiment of the first embodiment, the same QCL and/or TCI state and/or spatial filter may be applied by a UE in all transmission occasions, and in another embodiment of the first embodiment, different QCL and/or TCI states and/or spatial filters may be applied by the UE in different transmission occasion.

In some embodiments, resource allocation for SL PRS may be done with mode 1 based scheduling. In some embodiments of the first embodiment, a UE that is configured for DL positioning techniques may determine that a positioning error estimate is beyond a certain threshold and may trigger a SL positioning technique to calculate a relative positioning between UEs, thereby correcting positioning estimates and reporting the positioning estimates to a LMF. In such embodiments, SL positioning may be used to complement Uu positioning (e.g., DL-based positioning) to provide a better location estimate. In various embodiments of the first embodiment, a positioning error estimate is calculated by a LMF and may be provided to a TX UE or by a UE based on network based or UE based positioning. In certain embodiments, a threshold for positioning accuracy may be provided by a network to UEs using an LTE positioning protocol ("LPP").

In various embodiments, on-demand SL PRS configuration may be provided with a source-destination ID and the SL PRS configuration may be applicable for a certain destination group ID.

In some embodiments, if a gNB or a LMF wants to determine a precise positioning between a first UE (UEA) and a second UE (UEB), then LPP signaling may contain UEA location information (e.g., which may be coarse absolute position information) and the UEB may use an on demand SL positioning technique to determine a precise positioning between the UEA and the UEB. In such embodiments, the UE may use one or more panels from an available set of panels for SL PRS transmission based on a provided coarse position.

In various embodiments, if on-demand SL positioning is requested by an LMF or a gNB for one or more UEs (e.g., between a first UE (UEA) and a second UE (UEB)), then the LMF or the gNB may provide information about an absolute position of one of the UEs (UEA) to UEB so that UEB may use a SL positioning technique to precisely calculate a position between them or to calculate an absolute position of UEB. As may be appreciated, sharing of other UEs location in LPP or gNB signaling may not be limited to SL positioning.

In certain embodiments, Uu positioning information of a first UE (UEA) may be transmitted from UEA to a second UE (UEB) in SCI, a medium access control ("MAC") control element ("CE"), or RRC signaling to help UEB to calculate a precise relative positioning or an absolute position by further transmitting SL PRS. As may be appreciated, one or more embodiments described herein may be combined.

Figure 4:
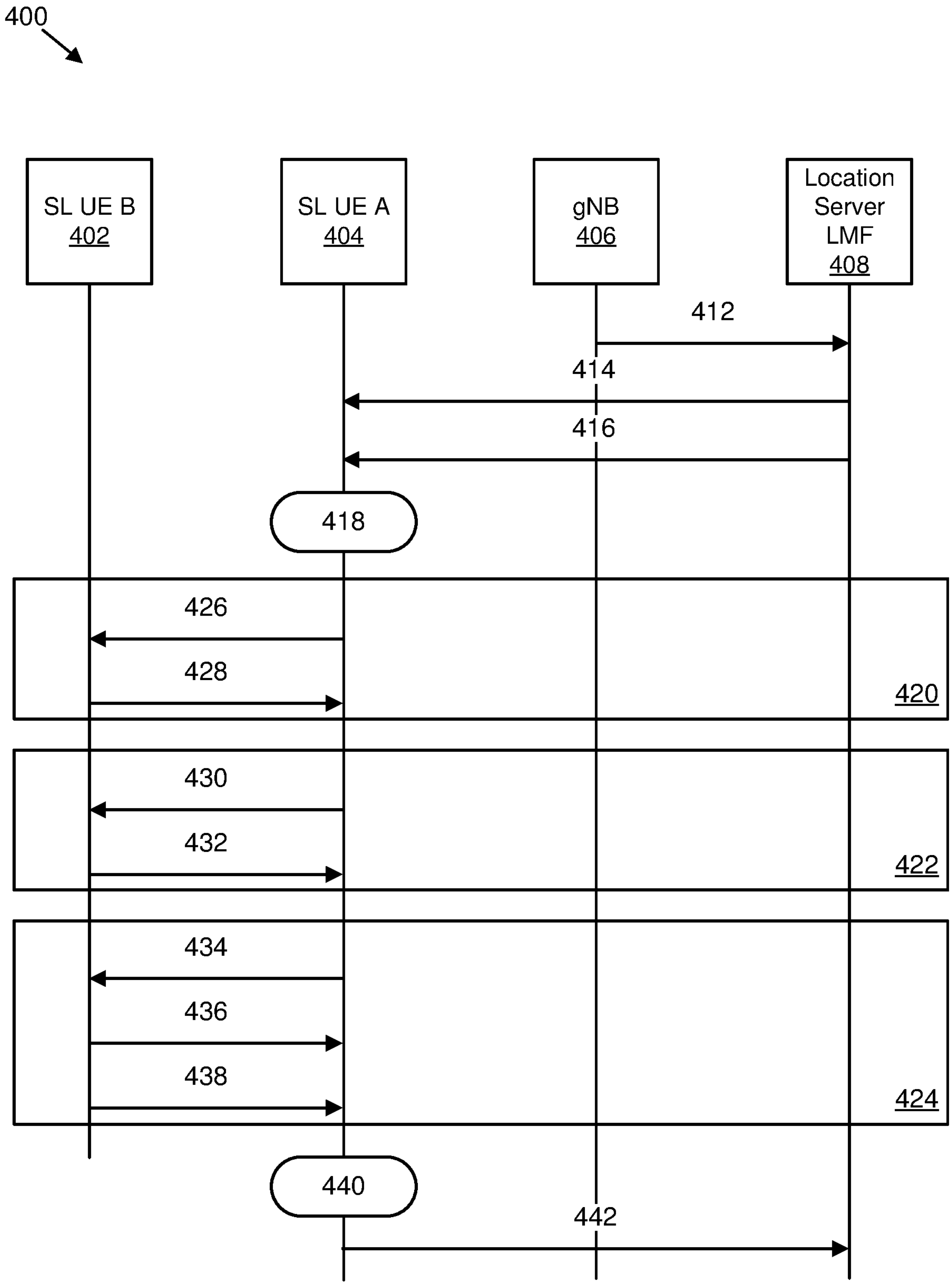
FIG. 4 is a network communication diagram illustrating one embodiment of on-demand sidelink positioning reference signal resource transmission.

FIG. 4 is a network communication diagram 400 illustrating one embodiment of on-demand sidelink positioning reference signal resource transmission. The diagram 400 illustrates a SL UE B 402, a SL UE A 404, a gNB 406, and a location server LMF 408. As may be appreciated, each of the illustrated messages may include one or more messages.

In a first communication 412 transmitted between the gNB 406 and the location server LMF 408, the gNB 406 transmits a PRS configuration (e.g., using an NRPPa protocol) to the location server LMF 408.

In a second communication 414 transmitted from the location server LMF 408 to the SL UE A 404, the location server LMF 408 transmits assistance information for SL positioning (e.g., SL RS, occasion, repetition, COMB pattern, subchannel size, BW, positioning technique, report type) (e.g., using an LPP protocol) to the SL UE A 404.

In a third communication 416 transmitted from the location server LMF 408 to the SL UE A 404, the location server LMF 408 transmits a request for positioning (e.g., using an LPP protocol) to the SL UE A 404.

The SL UE A 404 determines 418 that an accuracy cannot be met and initiates SL positioning.

A model A 420, model B 422, and model C 424 are illustrated.

In a fourth communication 426 transmitted from the SL UE A 404 to the SL UE B 402, the SL UE A 404 transmits a SL PRS transmission to the SL UE B 402, and in a fifth communication 428 transmitted from the SL UE B 402 to the SL UE A 404, the SL UE B 402 transmits a SL position report to the SL UE A 404. The fourth communication 426 and the fifth communication 428 may be considered model A 420.

In a sixth communication 430 transmitted from the SL UE A 404 to the SL UE B 402, the SL UE A 404 transmits a SL PRS transmission request to the SL UE B 402, and in a seventh communication 432 transmitted from the SL UE B 402 to the SL UE A 404, the SL UE B 402 transmits a SL PRS transmission to the SL UE A 404. The sixth communication 430 and the seventh communication 432 may be considered model B 422.

In an eighth communication 434 transmitted from the SL UE A 404 to the SL UE B 402, the SL UE A 404 transmits a SL PRS transmission and a SL PRS transmission request to the SL UE B 402, in a ninth communication 436 transmitted from the SL UE B 402 to the SL UE A 404, the SL UE B 402 transmits a SL PRS transmission to the SL UE A 404, and in a tenth communication 438 transmitted from the SL UE B 402 to the SL UE A 404, the SL UE B 402 transmits a SL report to the SL UE A 404. The eighth communication 434, the ninth communication 436, and the tenth communication 438 may be considered model C 424.

The SL UE A 404 calculates 440 an absolute positioning In an eleventh communication 442 transmitted from the SL UE A 404 to the location server LMF 408, the SL UE A 404 transmits a report for positioning to the location server LMF 408.

In a second embodiment, mode 1 on demand SL PRS may be used. In certain embodiments, uplink control signaling may be configured for an in-coverage UE to request resources from a gNB or LMF for SL PRS transmission. In some embodiments, a separate scheduling request ("SR") may be configured to request a resource for SL PRS and/or a separate SR configuration for different accuracy, latency, and/or SR may carry extra information about the accuracy and/or latency requirements. In various embodiments, RRC signaling may carry a positioning related request, an accuracy, a latency, and so forth. In certain embodiments, a MAC CE may be used to convey a SL PRS request, an accuracy, and/or a latency to a gNB.

In some embodiments, a gNB may configure multiple SL PRS resources for a UE using RRC signaling and the UE may activate one or more of the resources depending on accuracy and/or latency requirements using SCI, a MAC CE, or higher layer signaling. In various embodiments, a SL grant from a gNB or RRC signaling may activate a SL PRS resource from a configured resource set. In such embodiments, the SL grant from the gNB may contain one or more of the following: a SL PRS comb pattern, a time occasion, a SL PRS offset, a destination ID, SL TCI, QCL information, and/or a reporting configuration (e.g., reporting type, resource for reporting).

In certain embodiments, such as for on-demand SL PRS transmission, reporting from a UE to a gNB may be based on a physical uplink control channel ("PUCCH"), uplink control information ("UCI") over a physical uplink shared channel ("PUSCH"), a MAC CE, or RRC signaling. In such embodiments, combined Uu and SL positioning reporting may be configured.

In a third embodiment, SCI content for SL PRS may be defined. In some embodiments, a resource pool configuration includes a first SCI format and/or a first SCI size. In various embodiments, a first SCI format or SCI may be different from a resource pool containing SL data and a resource pool containing SL PRS. In certain embodiments, a same SCI size for a resource pool containing SL data and a resource pool containing SL PRS may be used, and one bit may be used to indicate whether content of a SCI format is for SL data or SL PRS transmission.

Figure 5:
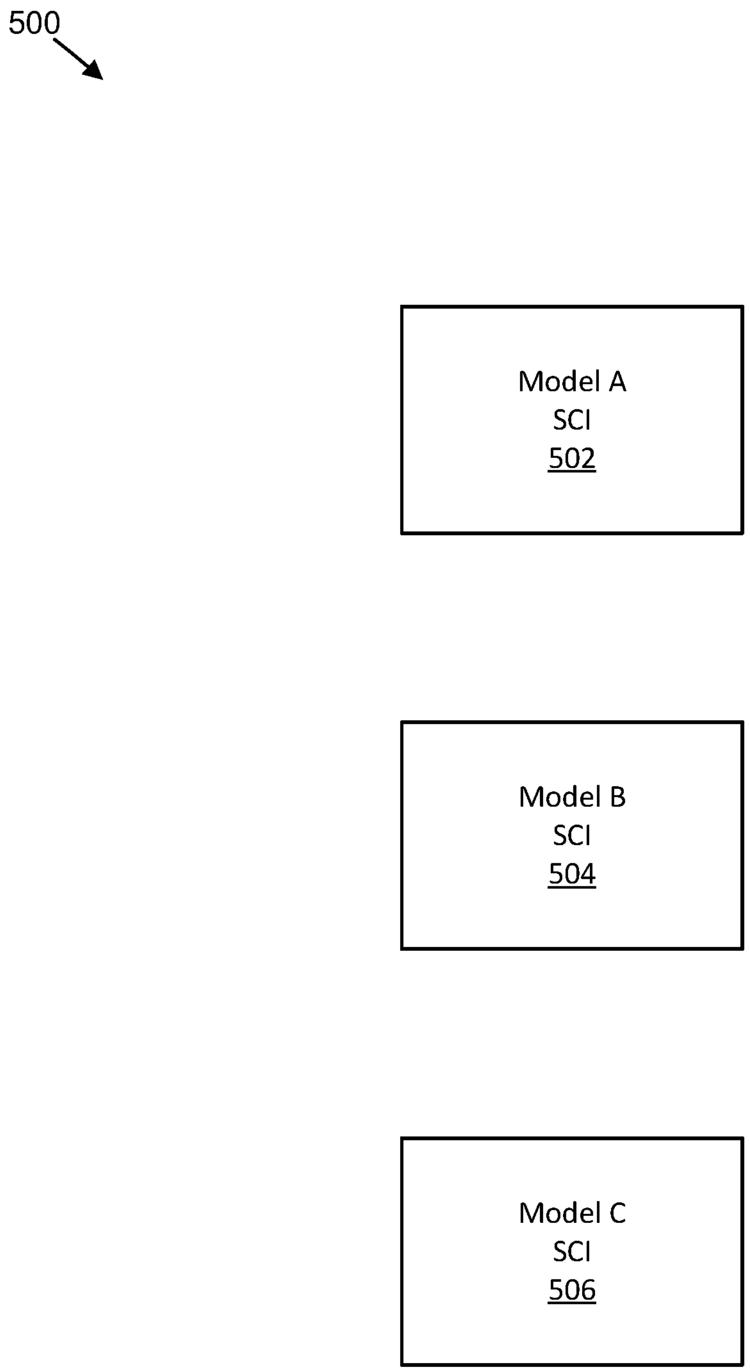
FIG. 5 is a schematic block diagram illustrating one embodiment of sidelink configuration information models.

FIG. 5 is a schematic block diagram 500 illustrating one embodiment of sidelink configuration information models. Specifically, model A SCI 502, model B SCI 504, and model C SCI 506 are illustrated.

The model A SCI 502 includes, in one embodiment, first SCI content that includes one or more parameters for SL PRS transmission. The first SCI content and SL PRS may be transmitted in the same slot and first SCI symbol and/or SL PRS may be multiplexed in different time domain symbols. The one or more parameters for SL PRS transmission may include: 1) one bit to indicate that SL PRS instead of SL data (e.g., for RPs allowing multiplexing of SL data and/or SL PRS) or a new radio network temporary identifier ("RNTI") such as PRS-RNTI may be used to scramble the SCI and implicitly enable the UE to identify the SL PRS related signaling; 2) a priority of a SL PRS transmission in SCI (e.g., defined as a priority based on accuracy and latency, time to first fix or delay budget according to a positioning service); 3) a number of subchannels used for SL PRS transmission; 4) a time slot for the initial SL PRS transmission and reservation resources for the future SL PRS transmission; 5) a reservation interval in terms of time periodicity; 6) one-bit indicating that a second SCI is not transmitted; 7) field SL PRS comb pattern indication (e.g., instead of a demodulation reference signal ("DMRS") pattern); 8) a SL PRS offset (e.g., subcarrier offset with respect to a starting SC in a resource pool, carrier, or bandwidth part ("BWP"); 9) an indication to ignore other fields related to SL data transmission such as a modulation and coding scheme ("MCS"), beta offset, and so forth if a bit indicates that there is no SL data transmitted; 10) a source ID (e.g., destination is transmitted either in a first stage or higher layer signaling); 11) QCL and/or TCI related information for SL PRS reception; 12) a positioning technique to be used by an RX UE; and/or 12) a time slot offset indicating time slot offset for the report transmission.

The model B SCI 504 includes, in one embodiment, a request message for SL PRS transmission indicated in a first or second stage SCI, a MAC CE, or PC5 radio resource control ("RRC"). The request for SL PRS transmission for receive ("RX") UEs may be transmitted by any SCI transmission scheduling SL data. The request message may include: 1) one bit indicating a SL PRS request and/or trigger (e.g., TX-UE request SL PRS from RX UEs, transmission of current SCI for a transport block ("TB") to reserve future PRS resources); 2) a SL PRS time occasion from an RX UE to a transmit ("TX") UE; and/or 3) a determination of a SL PRS offset for each UE based on a member ID, and/or a cast type (e.g., many-to-one, one-to-one). In such embodiments, signaling of a SL PRS configuration for transmission from a LMF to UEs may be with common RRC signaling.

The model C SCI 506 includes a combination of SCI including higher layer signaling based on model A SCI 502, model B SCI 504 for SL PRS transmission from both TX UE to RX UE and RX UE to TX UE. As may be appreciated, some SCI from any of model A SCI 502, model B SCI 504, and model C SCI 506 may be transmitted in second SCI.

In certain embodiments, multiple PRS triggers with overlapping PRS report windows may be configured by a TX UE. Moreover, in such embodiments, an RX UE may transmit a PRS ID, a session ID, a trigger ID, a request ID, or a positioning technique along with the PRS report to associate a PRS trigger with a PRS report. Further, in such embodiments, each PRS trigger may have different SL positioning techniques. In some embodiments, SCI, a MAC CE, or higher layer signaling may indicate separate SL positioning techniques to be applied for each repetition in multiple repetitions. In various embodiments, multiple SL positioning techniques may be applied for each repetition in multiple repetitions.

In a fourth embodiment, SL positioning reporting between SL UEs may be used. In certain embodiments, details on report transmission may include: 1) one or more report transmissions (e.g., MAC CE, physical sidelink feedback channel ("PSFCH"), SCI, RRC—the reports may be transmitted using MAC CE, a PSFCH, or SCI); 2) PSFCH—reports are transmitted in the same resource pool to TX UE—a time gap between SL PRS and a report may be configured per RP, a PSFCH resource for reporting may be based on a subset of subchannels used for PRS transmission and may start from a lowest subchannel index; 3) a MAC CE—a new MAC CE with a field for positioning reporting may be used—a latency bound for report transmission and/or a priority of the MAC CE may be configured (e.g., preconfigured) by a gNB based on an accuracy and a latency of a positioning update—a separate SR may be configured to request a mode 1 resource; 4) SCI—either first or second SCI may carry information about a positioning report; and/or 5) RRC—PC5 RRC signaling may be used for report transmission.

In some embodiments, a positioning report contains information related to a source-destination ID and/or a destination group ID. In various embodiments, a positioning report may be transmitted via unicast or groupcast transmission. In certain embodiments, a cast type of report transmission may be signaled by UEs or a higher layer.

In a fifth embodiment, a SL positioning report may be transmitted to a LMF. In such embodiments, the SL positioning report may contain relative positioning information for each source-destination ID or link ID from a TX UE to any RX UE calculated in a group, and a report may be tagged with a corresponding source-destination ID.

Figure 6:
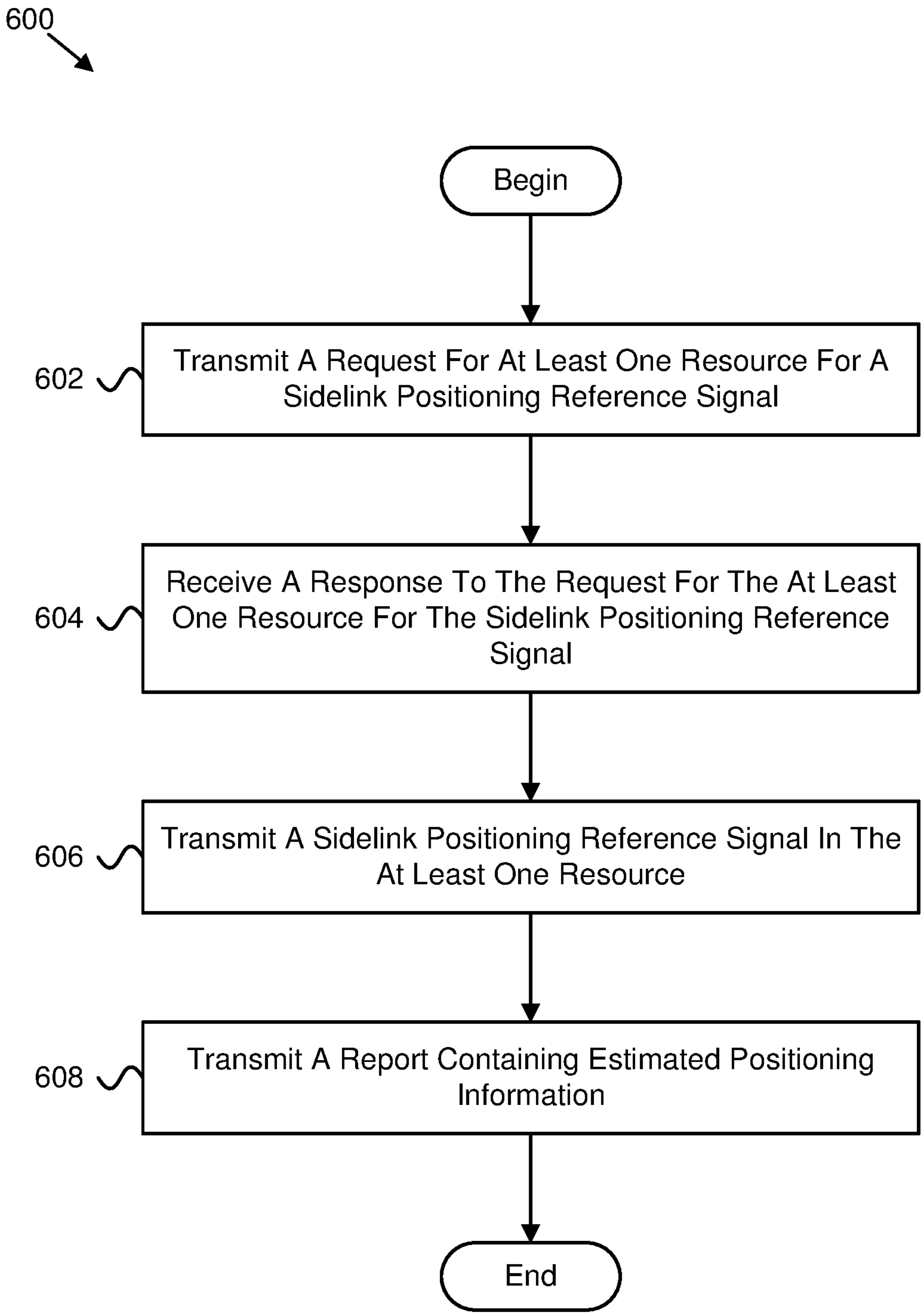
FIG. 6 is a flow chart diagram illustrating one embodiment of a method for requesting a sidelink positioning reference signal resource.

FIG. 6 is a flow chart diagram illustrating one embodiment of a method 600 for requesting a sidelink positioning reference signal resource. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602 a request for at least one resource for a sidelink positioning reference signal. In some embodiments, the method 600 includes receiving 604 a response to the request for the at least one resource for the sidelink positioning reference signal. In certain embodiments, the method 600 includes transmitting 606 a sidelink positioning reference signal in the at least one resource. In various embodiments, the method 600 includes transmitting 608 a report containing estimated positioning information.

In certain embodiments, the request is transmitted using a scheduling request configured to be used to make the request to a gNB. In some embodiments, the scheduling request is configured for a specific accuracy, for a specific latency, to carry information about the specific accuracy, to carry information about the specific latency, or some combination thereof. In various embodiments, transmitting the request comprises transmitting the request using radio resource control signaling or using a medium access control control element.

In one embodiment, the response contains a configured grant resource for the transmission of the sidelink positioning reference signal or a dynamic grant resource for the transmission of the sidelink positioning reference signal. In certain embodiments, the configured grant resource is activated based on an accuracy requirement, a latency requirement, or a combination thereof, and the configured grant resource is activated using sidelink control information, a medium access control control element, or higher layer signaling. In some embodiments, the method 600 further comprises receiving a sidelink grant, wherein the sidelink grant comprises a sidelink positioning reference signal comb pattern, a time occasion, a sidelink positioning reference signal offset, a destination identifier, a sidelink transmission configuration indicator, quasi-co-location information, a reporting configuration, or some combination thereof.

In various embodiments, the method 600 further comprises transmitting a report using a physical uplink control channel transmission, uplink control information over a physical uplink shared channel, a medium access control control element, radio resource control signaling, a physical sidelink feedback channel transmission, or sidelink control information. In one embodiment, the report comprises information indicating a source identifier, a destination identifier, a group destination identifier, or a combination thereof. In certain embodiments, the report is transmitted using unicast or groupcast transmission.

In some embodiments, the method 600 further comprises transmitting sidelink control information for a sidelink positioning reference signal transmission together with the sidelink positioning reference signal transmission. In various embodiments, the sidelink control information and the sidelink positioning reference signal transmission are transmitted in the same slot. In one embodiment, first sidelink control information symbols and the sidelink positioning reference signal transmission are multiplexed in different time domain symbols.

In certain embodiments, the sidelink control information comprises: one bit indicating presence of the sidelink positioning reference signal transmission or sidelink data; a priority of the sidelink positioning reference signal transmission in the sidelink control information is defined based on accuracy, latency, or a combination thereof; an indicator indicating a time and frequency resource for transmission of the sidelink positioning reference signal, wherein the time and frequency resource comprises a resource for an initial sidelink positioning reference signal transmission and a future reservation; or some combination thereof. In some embodiments, the sidelink control information further comprises: a field sidelink positioning reference signal comb pattern indication; a sidelink positioning reference signal offset; quasi-co-location information; a positioning technique indicating a time difference of arrival, an angle of departure, an angle of arrival, a multi-round trip time, or a combination thereof; a report transmission slot offset; or some combination thereof. In various embodiments, the method 600 further comprises transmitting a plurality of presence indicators indicating the sidelink positioning reference signal or a request for the transmission of the sidelink positioning reference signal, wherein each presence indicator of the plurality of present indicators or the request is associated with a positioning technique for a plurality of receiver user equipments.

In one embodiment, the sidelink control information comprises: a request bit indicating the request for the at least one resource for the sidelink positioning reference signal from at least one receiver user equipment; time-frequency resource reservation information; a sidelink positioning reference signal offset at each receiver user equipment based on an internal group member identifier; a cast type of the sidelink positioning reference signal; reception of the sidelink positioning reference signal; or some combination thereof. In certain embodiments, the method 600 further comprises transmitting a plurality of presence indicators indicating the sidelink positioning reference signal or a request for the transmission of the sidelink positioning reference signal, wherein each presence indicator of the plurality of present indicators or the request is associated with a positioning technique for a plurality of receiver user equipments.

In one embodiment, a method comprises: transmitting a request for at least one resource for a sidelink positioning reference signal; receiving a response to the request for the at least one resource for the sidelink positioning reference signal; transmitting a sidelink positioning reference signal in the at least one resource; and transmitting a report containing estimated positioning information.

In certain embodiments, the request is transmitted using a scheduling request configured to be used to make the request to a gNB.

In some embodiments, the scheduling request is configured for a specific accuracy, for a specific latency, to carry information about the specific accuracy, to carry information about the specific latency, or some combination thereof.

In various embodiments, transmitting the request comprises transmitting the request using radio resource control signaling or using a medium access control control element.

In one embodiment, the response contains a configured grant resource for the transmission of the sidelink positioning reference signal or a dynamic grant resource for the transmission of the sidelink positioning reference signal.

In certain embodiments, the configured grant resource is activated based on an accuracy requirement, a latency requirement, or a combination thereof, and the configured grant resource is activated using sidelink control information, a medium access control control element, or higher layer signaling.

In some embodiments, the method further comprises receiving a sidelink grant, wherein the sidelink grant comprises a sidelink positioning reference signal comb pattern, a time occasion, a sidelink positioning reference signal offset, a destination identifier, a sidelink transmission configuration indicator, quasi-co-location information, a reporting configuration, or some combination thereof.

In various embodiments, the method further comprises transmitting a report using a physical uplink control channel transmission, uplink control information over a physical uplink shared channel, a medium access control control element, radio resource control signaling, a physical sidelink feedback channel transmission, or sidelink control information.

In one embodiment, the report comprises information indicating a source identifier, a destination identifier, a group destination identifier, or a combination thereof.

In certain embodiments, the report is transmitted using unicast or groupcast transmission.

In some embodiments, the method further comprises transmitting sidelink control information for a sidelink positioning reference signal transmission together with the sidelink positioning reference signal transmission.

In various embodiments, the sidelink control information and the sidelink positioning reference signal transmission are transmitted in the same slot.

In one embodiment, first sidelink control information symbols and the sidelink positioning reference signal transmission are multiplexed in different time domain symbols.

In certain embodiments, the sidelink control information comprises: one bit indicating presence of the sidelink positioning reference signal transmission or sidelink data; a priority of the sidelink positioning reference signal transmission in the sidelink control information is defined based on accuracy, latency, or a combination thereof; an indicator indicating a time and frequency resource for transmission of the sidelink positioning reference signal, wherein the time and frequency resource comprises a resource for an initial sidelink positioning reference signal transmission and a future reservation; or some combination thereof.

In some embodiments, the sidelink control information further comprises: a field sidelink positioning reference signal comb pattern indication; a sidelink positioning reference signal offset; quasi-co-location information; a positioning technique indicating a time difference of arrival, an angle of departure, an angle of arrival, a multi-round trip time, or a combination thereof; a report transmission slot offset; or some combination thereof.

In various embodiments, the method further comprises transmitting a plurality of presence indicators indicating the sidelink positioning reference signal or a request for the transmission of the sidelink positioning reference signal, wherein each presence indicator of the plurality of present indicators or the request is associated with a positioning technique for a plurality of receiver user equipments.

In one embodiment, the sidelink control information comprises: a request bit indicating the request for the at least one resource for the sidelink positioning reference signal from at least one receiver user equipment; time-frequency resource reservation information; a sidelink positioning reference signal offset at each receiver user equipment based on an internal group member identifier; a cast type of the sidelink positioning reference signal; reception of the sidelink positioning reference signal; or some combination thereof.

In certain embodiments, the method further comprises transmitting a plurality of presence indicators indicating the sidelink positioning reference signal or a request for the transmission of the sidelink positioning reference signal, wherein each presence indicator of the plurality of present indicators or the request is associated with a positioning technique for a plurality of receiver user equipments.

In one embodiment, an apparatus comprises: a transmitter that transmits a request for at least one resource for a sidelink positioning reference signal; and a receiver that receives a response to the request for the at least one resource for the sidelink positioning reference signal, wherein the transmitter transmits a sidelink positioning reference signal in the at least one resource, and transmits a report containing estimated positioning information.

In certain embodiments, the request is transmitted using a scheduling request configured to be used to make the request to a gNB.

In some embodiments, the scheduling request is configured for a specific accuracy, for a specific latency, to carry information about the specific accuracy, to carry information about the specific latency, or some combination thereof.

In various embodiments, the transmitter transmitting the request comprises the transmitter transmitting the request using radio resource control signaling or using a medium access control control element.

In one embodiment, the response contains a configured grant resource for the transmission of the sidelink positioning reference signal or a dynamic grant resource for the transmission of the sidelink positioning reference signal.

In certain embodiments, the configured grant resource is activated based on an accuracy requirement, a latency requirement, or a combination thereof, and the configured grant resource is activated using sidelink control information, a medium access control control element, or higher layer signaling.

In some embodiments, the receiver receives a sidelink grant, and the sidelink grant comprises a sidelink positioning reference signal comb pattern, a time occasion, a sidelink positioning reference signal offset, a destination identifier, a sidelink transmission configuration indicator, quasi-co-location information, a reporting configuration, or some combination thereof.

In various embodiments, the transmitter transmits a report using a physical uplink control channel transmission, uplink control information over a physical uplink shared channel, a medium access control control element, radio resource control signaling, a physical sidelink feedback channel transmission, or sidelink control information.

In one embodiment, the report comprises information indicating a source identifier, a destination identifier, a group destination identifier, or a combination thereof.

In certain embodiments, the report is transmitted using unicast or groupcast transmission.

In some embodiments, the transmitter transmits sidelink control information for a sidelink positioning reference signal transmission together with the sidelink positioning reference signal transmission.

In various embodiments, the sidelink control information and the sidelink positioning reference signal transmission are transmitted in the same slot.

In one embodiment, first sidelink control information symbols and the sidelink positioning reference signal transmission are multiplexed in different time domain symbols.

In certain embodiments, the sidelink control information comprises: one bit indicating presence of the sidelink positioning reference signal transmission or sidelink data; a priority of the sidelink positioning reference signal transmission in the sidelink control information is defined based on accuracy, latency, or a combination thereof; an indicator indicating a time and frequency resource for transmission of the sidelink positioning reference signal, wherein the time and frequency resource comprises a resource for an initial sidelink positioning reference signal transmission and a future reservation; or some combination thereof.

In some embodiments, the sidelink control information further comprises: a field sidelink positioning reference signal comb pattern indication; a sidelink positioning reference signal offset; quasi-co-location information; a positioning technique indicating a time difference of arrival, an angle of departure, an angle of arrival, a multi-round trip time, or a combination thereof; a report transmission slot offset; or some combination thereof.

In various embodiments, the transmitter transmits a plurality of presence indicators indicating the sidelink positioning reference signal or a request for the transmission of the sidelink positioning reference signal, and each presence indicator of the plurality of present indicators or the request is associated with a positioning technique for a plurality of receiver user equipments.

In one embodiment, the sidelink control information comprises: a request bit indicating the request for the at least one resource for the sidelink positioning reference signal from at least one receiver user equipment; time-frequency resource reservation information; a sidelink positioning reference signal offset at each receiver user equipment based on an internal group member identifier; a cast type of the sidelink positioning reference signal; reception of the sidelink positioning reference signal; or some combination thereof.

In certain embodiments, the transmitter transmits a plurality of presence indicators indicating the sidelink positioning reference signal or a request for the transmission of the sidelink positioning reference signal, and each presence indicator of the plurality of present indicators or the request is associated with a positioning technique for a plurality of receiver user equipments.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

transmitting sidelink control information (SCI) that indicates a request for at least one resource for a sidelink positioning reference signal (SL-PRS), wherein the request is transmitted to a base station using a bit indicating the request is being made; and transmitting the SL-PRS in the at least one resource based at least in part on the request, wherein the SL-PRS is transmitted in a same slot as the transmitted SCI.

2. The method of claim 1, wherein the resources are configured for at least one of a specific accuracy, a specific latency, to carry information about the specific accuracy, and to carry information about the specific latency.

3. The method of claim 1, wherein transmitting the request comprises transmitting the request using radio resource control (RRC) signaling or using a medium access control (MAC) control element (CE).

4. The method of claim 1, wherein a response contains a configured grant resource for the transmission of the SL-PRS or a dynamic grant resource for the transmission of the SL-PRS.

5. The method of claim 4, wherein the configured grant resource is activated based on an accuracy requirement, a latency requirement, or both, and the configured grant resource is activated using sidelink control information (SCI), a medium access control (MAC) control element (CE), or higher layer signaling.

6. The method of claim 1, further comprising receiving a sidelink grant, wherein the sidelink grant comprises at least one of a SL-PRS comb pattern, a time occasion, a SL-PRS offset, a destination identifier, a sidelink transmission configuration indicator, quasi-co-location (QCL) information, and a reporting configuration.

7. The method of claim 1, further comprising transmitting a report using a physical uplink control channel (PUCCH) transmission, uplink control information (UCI) over a physical uplink shared channel (PUSCH), a medium access control (MAC) control element (CE), radio resource control (RRC) signaling, a physical sidelink feedback channel (PSFCH) transmission, or SCI.

8. The method of claim 7, wherein the report comprises information indicating one or more of a source identifier, a destination identifier, and a group destination identifier.

9. The method of claim 7, wherein the report is transmitted using unicast or groupcast transmission.

10. The method of claim 1, further comprising transmitting SCI for a SL-PRS transmission together with the SL-PRS transmission.

11. The method of claim 1, wherein first SCI symbols and the transmission of SL-PRS are multiplexed in different time domain symbols.

12. The method of claim 10, wherein the SCI comprises one or more of:

one bit indicating presence of the SL-PRS transmission or sidelink data;

a priority of the SL-PRS transmission in the SCI is defined based on accuracy, latency, or a combination thereof; and an indicator indicating a time and frequency resource for transmission of the SL-PRS, wherein the time and frequency resource comprises a resource for an initial SL-PRS transmission and a future reservation.

13. The method of claim 12, wherein the SCI further comprises one or more of:

a field SL-PRS comb pattern indication;

a SL-PRS offset;

quasi-co-location information;

a positioning technique indicating a time difference of arrival, an angle of departure, an angle of arrival, a multi-round trip time, or a combination thereof; and a report transmission slot offset.

14. The method of claim 12, further comprising transmitting a plurality of presence indicators indicating the SL-PRS or a request for the transmission of the SL-PRS, wherein each presence indicator of the plurality of presence indicators or the request is associated with a positioning technique for a plurality of receiver UEs.

15. The method of claim 10, wherein the SCI comprises one or more of a request bit indicating the request for the at least one resource for the SL-PRS from at least one receiver user equipment;

time-frequency resource reservation information;

a SL-PRS offset at each receiver user equipment based on an internal group member identifier;

a cast type of the SL-PRS; and reception of the SL-PRS.

16. The method of claim 15, further comprising transmitting a plurality of presence indicators indicating the SL-PRS or a request for the transmission of the SL-PRS, wherein each presence indicator of the plurality of presence indicators or the request is associated with a positioning technique for a plurality of receiver UEs.

17. A user equipment (UE), comprising:

at least one memory; and at least one processor coupled with the at least one memory and configured to cause the UE to:

transmit sidelink control information (SCI) that indicates a request for at least one resource for a sidelink positioning reference signal (SL-PRS), wherein the request is transmitted to a base station using a bit indicating the request is being made; and transmit the SL-PRS in the at least one resource based at least in part on the request, wherein the SL-PRS is transmitted in a same slot as the transmitted SCI.

18. A processor for wireless communication, comprising:

at least one controller coupled with at least one memory and configured to cause the processor to:

transmit sidelink control information (SCI) that indicates a request for at least one resource for a sidelink positioning reference signal (SL-PRS), wherein the request is transmitted to a base station using a bit indicating the request is being made; and transmit the SL-PRS in the at least one resource based at least in part on the request, wherein the SL-PRS is transmitted in a same slot as the transmitted SCI.

* * * * *